United States Patent
Ramzan et al.

(10) Patent No.: US 9,081,958 B2
(45) Date of Patent: Jul. 14, 2015

(54) USING CONFIDENCE ABOUT USER INTENT IN A REPUTATION SYSTEM

(75) Inventors: Zulfikar Ramzan, Cupertino, CA (US);
Walter Bogorad, Cupertino, CA (US);
Ameet Zaveri, Pleasanton, CA (US);
Vadim Antonov, Belmont, CA (US);
Carey Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 292 days.

(21) Appl. No.: 12/540,907

(22) Filed: Aug. 13, 2009

(65) Prior Publication Data

US 2011/0040825 A1  Feb. 17, 2011

(51) Int. Cl.
| G06F 15/16 | (2006.01) |
| G06F 21/56 | (2013.01) |
| G06F 21/55 | (2013.01) |
| H04L 12/58 | (2006.01) |
| H04L 29/06 | (2006.01) |

(52) U.S. Cl.
CPC ............ *G06F 21/56* (2013.01); *G06F 21/55* (2013.01); *H04L 12/585* (2013.01); *H04L 51/12* (2013.01); *H04L 63/1441* (2013.01)

(58) Field of Classification Search
USPC .......................................... 709/203, 223, 224
See application file for complete search history.

(56) References Cited

U.S. PATENT DOCUMENTS

| 5,878,144 A | 3/1999 | Aucsmith et al. |
| 2001/0037211 A1 | 11/2001 | McNutt et al. |
| 2002/0184509 A1 | 12/2002 | Scheidt et al. |
| 2003/0217137 A1 | 11/2003 | Roese et al. |
| 2004/0250074 A1 | 12/2004 | Kilian-Kehr |
| 2005/0114452 A1* | 5/2005 | Prakash ......................... 709/206 |
| 2005/0154924 A1 | 7/2005 | Scheidt et al. |
| 2005/0198181 A1 | 9/2005 | Ritter |
| 2006/0253581 A1* | 11/2006 | Dixon et al. .................. 709/225 |
| 2007/0094716 A1 | 4/2007 | Farino et al. |
| 2008/0059215 A1 | 3/2008 | Boyd |

(Continued)

FOREIGN PATENT DOCUMENTS

| CN | 101335721 A | 12/2008 |
| CN | 101399683 A | 4/2009 |

(Continued)

OTHER PUBLICATIONS

Prakash et al., "A Reputation-Based Approach for Efficient Filtration of Spam", Cloudmark, Inc., Apr. 2007, accessed Jul. 9, 2011 at <http://www.cloudmark.com/releases/docs/wp_reputation_10640406.pdf>.*

(Continued)

*Primary Examiner* — Liangche A Wang (74) *Attorney, Agent, or Firm* — Fenwick & West LLP (57) ABSTRACT

Reputations of objects are determined by a reputation system using reports from clients identifying the objects. Confidence metrics for the clients are generated using information determined from the reports. Confidence metrics indicate the amounts of confidence in the veracity of the reports. Reputation scores of objects are calculated using the reports from the clients and the confidence metrics for the clients. Confidence metrics and reputation scores are stored in correlation with identifiers for the objects. An object's reputation score is provided to a client in response to a request.

17 Claims, 4 Drawing Sheets

(56) References Cited

U.S. PATENT DOCUMENTS

| | | | |
|---|---|---|---|
| 2008/0280626 | A1 | 11/2008 | Choi et al. |
| 2009/0006569 | A1 | 1/2009 | Morss et al. |
| 2009/0158404 | A1 | 6/2009 | Hahn et al. |
| 2009/0282476 | A1* | 11/2009 | Nachenberg et al. ........... 726/22 |
| 2009/0328140 | A1 | 12/2009 | McPherson et al. |

FOREIGN PATENT DOCUMENTS

| | | |
|---|---|---|
| CN | 101459718 A | 6/2009 |
| JP | 2005-043351 A | 2/2005 |
| JP | 2007-164465 A | 6/2007 |
| JP | 2011-217046 A | 10/2011 |
| JP | 2011-527046 A | 10/2011 |
| WO | WO 2005/043351 A2 | 5/2005 |

OTHER PUBLICATIONS

PCT International Search Report and Written Opinion, PCT Application No. PCT/US2010/045022, Nov. 2, 2010, 12 pages.

Prakash, V.V. et al., "A Reputation-Based Approach for Efficient Filtration of Spam," Cloudmark®, Apr. 30, 2007, pp. 1-12, [Online] [Retrieved on Sep. 1, 2009] Retrieved from the Internet<URL:http://www.cloudmark.com/releases/docs/wp_reputation_filtration_10640_406.pdf>.

Ferreres, A.I.G.L-T. et al., "Spatial Temporal Certification Framework and Extension of X.509 Atrribute Certificate Framework and SAML Standard to Support Spatial-Temporal Certificates," Public Key Infrastructure, Lecture Notes in Computer Science, Springer, Jun. 28, 2007, pp. 321-329.

Harrison, R. et al., "Lightweight Directory Access Protocol (LDAP): Authentication Methods and Security Mechanisms; RFC4513.txt," IETF Standard, Internet Engineering Task Force, IETF, CH, Jun. 2006, 34 pages.

"HNBs Location Certification," Mitsubishi Electric, 3GPP Draft; R3-080065 (HBNS Location Certification), 3rd Generation Partnership Project (3GPP), Feb. 11-15, 2008, Sorrento, Italy, 3 pages.

Park, J.S., "Smart Certificates: Extending X.509 for Secure Attribute Services on the Web," National Information Systems Security Conference, 1999, pp. 337-348.

PCT Invitation to Pay Additional Fees, PCT Application No. PCT/US2010/048408, Dec. 1, 2010, 9 pages.

Ramsdell et al., "Secure/Multipurpose Internet Mail Extensions (S/MIME) Version 3.2, Certificate Handling," Internet Engineering Task Force, Standard Working Draft, Internet Society (ISOC), Apr. 27, 2009, 20 pages.

"From Zero-day to Real-time," McAfee, Inc., 2008, 9 pages.

"Reputation system—Wikipedia, the free encyclopedia," Last Modified May 4, 2010, Wikipedia®, 4 pages, [Online] [Retrieved on May 18, 2010] Retrieved from the Internet<URL:http://en.wikipedia.org/wiki/Reputation_systems>.

"Trend Micro™ Smart Protection Network™—Trend Micro USA," Trend Micro Incorporated, 1989-2010, 1 page [Online] [Retrieved on Mar. 18, 2010] Retrieved from the Internet<URL:http://us.trendmicro.com/us/trendwatch/core-technologies/smart-protection-network/>.

Written Opinion of the International Preliminary Examining Authority, PCT Application No. PCT/US2010/045022, Nov. 18, 2011, 10 pages.

PCT International Search Report and Written Opinion, PCT Application No. PCT/US2010/048408, Apr. 7, 2011, 18 pages.

United States Office Action, U.S. Appl. No. 12/559,976, Dec. 6, 2012, 10 pages.

PCT Notification of Transmittal of the International Preliminary Report on Patentability, PCT Application No. PCT/US2010/045022, Feb. 14, 2012, 18 pages.

United States Office Action, U.S. Appl. No. 12/559,976, filed Dec. 6, 2012, 10 pages.

Canadian Office Action, Canadian Application No. 2,763,201, Dec. 9, 2013, 4 pages.

Chinese Office Action, Chinese Application No. 201080032172.7, Apr. 18, 2014, 15 pages (with concise explanation of relevance).

Japanese Office Action, Japanese Application No. P2012-524786, Apr. 1, 2014, 4 pages (with concise explanation of relevance).

Canadian Office Action, Canadian Application No. 2,770,222, Dec. 30, 2013, 3 pages.

Canadian Office Action, Canadian Application No. 2,763,201, Oct. 14, 2014, 6 pages.

Chinese Second Office Action, Chinese Application No. 201080032172.7, Sep. 12, 2014, 40 pages.

Chinese Office Action, Chinese Application No. 201080032172.7, Mar. 18, 2015, 17 pages (with concise explanation of relevance).

European Examination Report, European Application No. 10752209.6, Mar. 2, 2015, 10 pages.

* cited by examiner

USING CONFIDENCE ABOUT USER INTENT IN A REPUTATION SYSTEM

BACKGROUND

1. Field of the Invention

This invention relates generally to computer security and particularly to detecting attempts to manipulate a reputation system for detecting malicious objects.

2. Description of the Related Art

A wide variety of malicious software (malware) can attack modem computers. Malware threats include computer viruses, worms, Trojan horse programs, spyware, adware, crimeware, and phishing websites. Malicious entities sometimes attack servers that store sensitive or confidential data that can be used to the malicious entity's own advantage. Similarly, other computers, including home computers, must be constantly protected from malicious software that can be transmitted when a user communicates with others via electronic mail, when a user downloads new programs or program updates, and in many other situations. The different options and methods available to malicious entities for attack on a computer are numerous.

Conventional techniques for detecting malware, such as signature string scanning, are becoming less effective. Modem malware is often targeted and delivered to only a relative handful of computers. For example, a Trojan horse program can be designed to target computers in a particular department of a particular enterprise. Such malware might never be encountered by security analysts, and thus the security software might never be configured with signatures for detecting such malware. Mass-distributed malware, in turn, can contain polymorphisms that make every instance of the malware unique. As a result, it is difficult to develop signature strings that reliably detect all instances of the malware.

Newer techniques for detecting malware involve the use of reputation systems. A reputation system can determine the reputation of a file or other object encountered on a computer in order to assess the likelihood that the object is malware. One way to develop the reputation for an object is to collect reports from networked computers on which the object is found and base the reputation on information within the reports.

However, because such a reputation system relies on reports from what are essentially unknown parties, it is susceptible to subversion by malicious actors. For example, an entity distributing malware could attempt to "game" the reputation system by submitting false reports indicating that the malware is legitimate. Thus, there is a need for a reputation system that is able to withstand such attempts to subvert its operation.

SUMMARY

The above and other needs are met by a method, computer-readable medium, and computer system for determining a reputation of an object in a reputation system. An embodiment of the method comprises receiving, from clients, reports identifying an object detected at the clients. The method further comprises determining information about the clients from the reports. In addition, the method comprises generating confidence metrics for the clients responsive to the determined information about the clients, the confidence metrics indicating amounts of confidence in the veracity of the reports received from the clients. The method also comprises calculating, based at least in part on the reports from the clients and the confidence metrics for the clients, a reputation score of the object and storing the reputation score of the object.

Embodiments of the computer-readable medium store computer program instructions for determining a reputation of an object in a reputation system, the instructions comprising instructions for receiving reports from clients in the reputation system, the reports identifying an object detected at the clients and determining information about the clients from the reports. The instructions further comprise instructions for generating confidence metrics for the clients responsive to the determined information about the clients, the confidence metrics indicating amounts of confidence in the veracity of the reports received from the clients. The instructions additionally comprise instructions for calculating a reputation score of the object responsive at least in part to the reports from the clients and the confidence metrics for the clients and storing the reputation score of the object.

Embodiments of the computer system comprise a computer-readable storage medium storing executable computer program instructions comprising instructions for receiving reports from clients in the reputation system, the reports identifying an object detected at the clients and determining information about the clients from the reports. The instructions further comprise instructions for generating confidence metrics for the clients responsive to the determined information about the clients, the confidence metrics indicating amounts of confidence in the veracity of the reports received from the clients. The instructions additionally comprise instructions for calculating a reputation score of the object responsive at least in part to the reports from the clients and the confidence metrics for the clients and storing the reputation score of the object. The computer system further comprises a processor for executing the computer program instructions.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
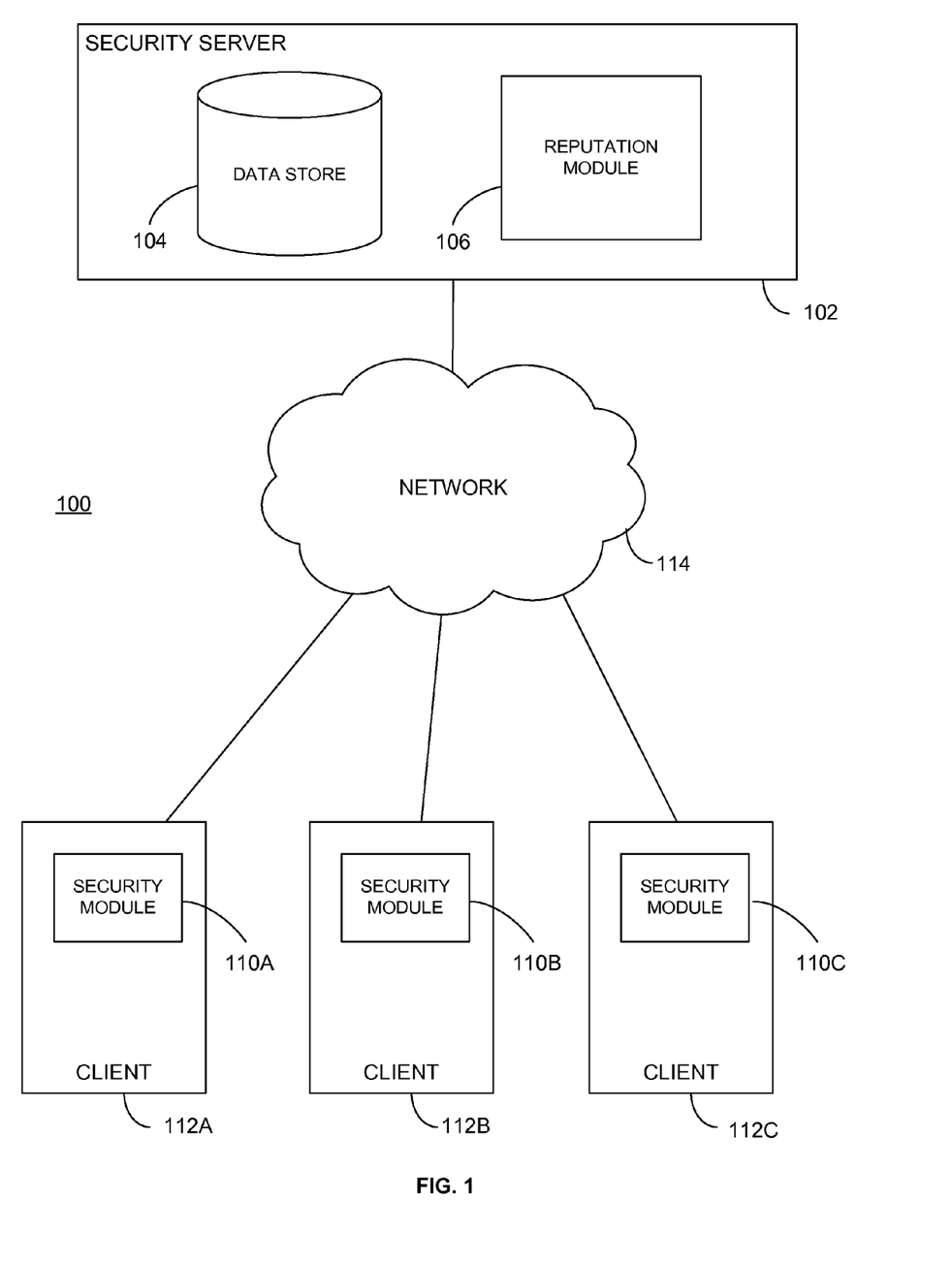
FIG. 1 is a high-level block diagram of a computing environment according to one embodiment of the present invention.

FIG. 1 is a high-level block diagram of a computing environment 100 according to one embodiment. FIG. 1 illustrates a security server 102 connected to a network 114. The network 114 is also connected to multiple clients 112. FIG. 1 and the other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral (e.g. "112" in the text refers to reference numerals "112A," "112B," and/or "112C" in the figures). Only three clients 112 are shown in FIG. 1 in order to simplify and clarify the description. Embodiments of the computing environment 100 can have thousands or millions of clients 112, as well as multiple servers 102. In some embodiments, the clients 112 are only connected to the network 114 for a certain period of time or not at all.

The client 112 is an electronic device that can host malicious software. In one embodiment, the client 112 is a conventional computer system executing, for example, a Microsoft Windows-compatible operating system (OS), Apple OS X, and/or a Linux distribution. In another embodiment, the client 112 is another device having computer functionality, such as a personal digital assistant (PDA), mobile telephone, video game system, etc. The client 112 typically stores numerous computer files and/or software applications (collectively referred to as "objects") that can host malicious software.

Malicious software, sometimes called "malware," is generally defined as software that executes on the client 112 surreptitiously or that has some surreptitious functionality. Malware can take many forms, such as parasitic viruses that attach to legitimate files, worms that exploit weaknesses in the computer's security in order to infect the computer and spread to other computers, Trojan horse programs that appear legitimate but actually contain hidden malicious code, and spyware that monitors keystrokes and/or other actions on the computer in order to capture sensitive information or display advertisements.

The client 112 executes a security module 110 for detecting the presence of malware. The security module 110 can be, for example, incorporated into the OS of the computer or part of a separate comprehensive security package. In one embodiment, the security module 110 is provided by the entity that operates the security server 102. The security module 110 can communicate with the security server 102 via the network 114 in order to download information utilized to detect malicious software. The security module 110 can also communicate with the security server 102 via the network 114 to submit information about objects detected at the client 112.

In one embodiment, security module 110 submits identifiers of objects detected at the client to the security server 102 and receives reputation scores for the objects in return. The reputation score represents an assessment of the trustworthiness of the object. An object with a high reputation score has a good reputation and is unlikely to contain malware. An object with a low reputation score, conversely, has a poor reputation and might contain malware. The security module 110 uses the reputation score, along with other factors such as behaviors, to evaluate whether an object at the client 112 is malware. The security module 110 can report the outcome of the evaluation to the security server 102.

The security server 102 is provided by a security software vendor or other entity. The security server 102 can include one or more standard computer systems configured to communicate with clients 112 via the network 114. The security server 102 receives reports containing identifiers of objects and other information from the clients 112 via the network 114. The security server 102 sends reputation scores for the objects to the clients 112 via the network 114 in response.

In one embodiment, the security server 102 comprises a data store 104 and a reputation module 106. The reputation module 106 determines reputation scores of the objects based on factors such as how often the objects are encountered by the clients 112. These reputation scores are stored in the data store 104 by the reputation module 106. The reputation module 106 accesses the data store 104 in response to queries or submissions from clients 112 via the network 114.

An embodiment of the reputation module 106 also determines confidence metrics for the clients 112. The confidence metric for a client 112 indicates an amount of confidence in the veracity of the information received from that client, where a high confidence metric indicates that the information is likely true. For example, a high volume of reports coming from a particular client 112 might indicate that the client is being controlled by a malicious entity that is attempting to influence object reputations by submitting false reports. The reputation module 106 can detect such attempts to influence object reputations and lower the confidence metrics of the corresponding clients 112. The reputation module 106 can discount the weights of reports from clients 112 having low confidence metrics, and boost the weights of reports from clients having high confidence metrics, when determining the reputations for objects. Therefore, the reputation module 106 is resistant to attempts from malicious entities to manipulate or otherwise "game" the security server 102.

The network 114 enables communications between the security server 102 and the clients 112. In one embodiment, the network 114 uses standard communications technologies and/or protocols and comprises the Internet. Thus, the network 114 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
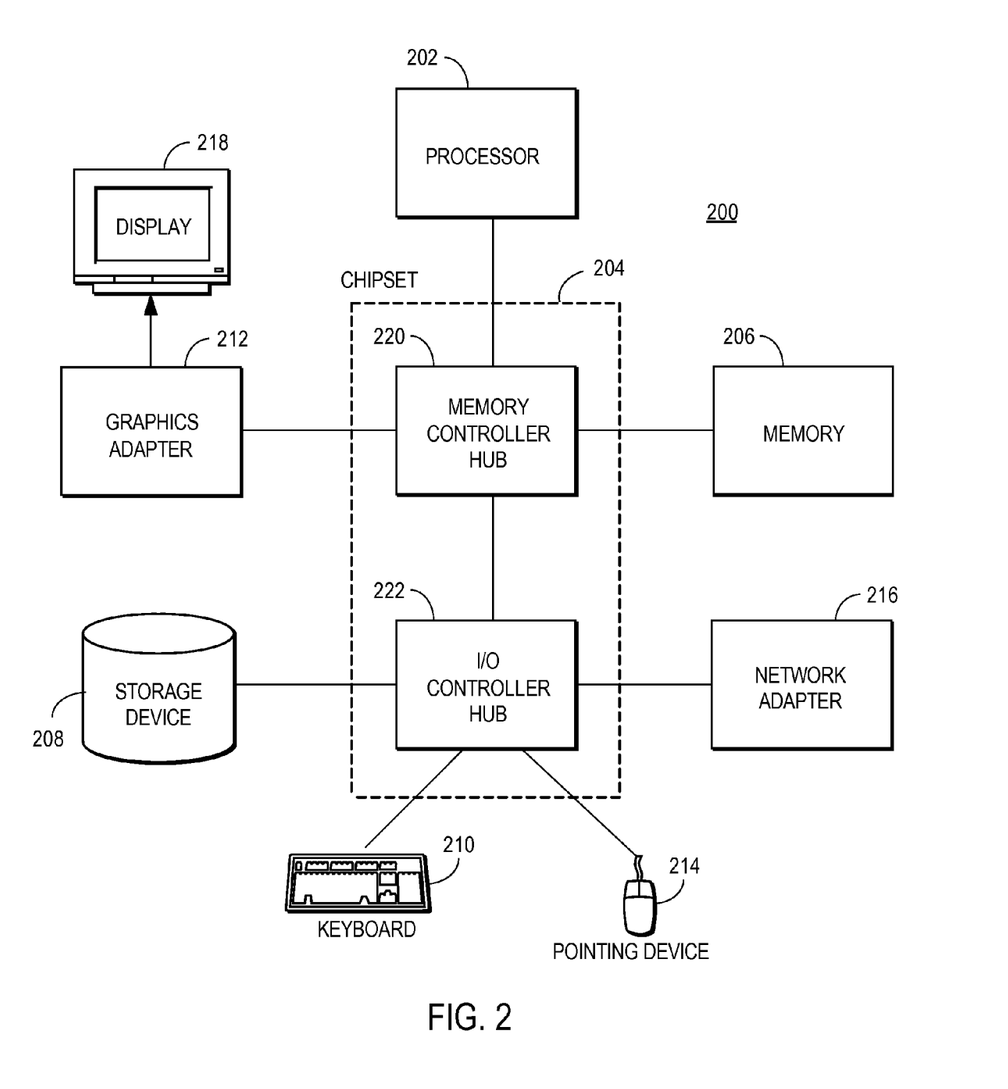
FIG. 2 is a high-level block diagram of a computer for acting as a security server and/or a client according to one embodiment.

FIG. 2 is a high-level block diagram of a computer 200 for acting as a security server 102 and/or a client 112 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a security server 102 lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
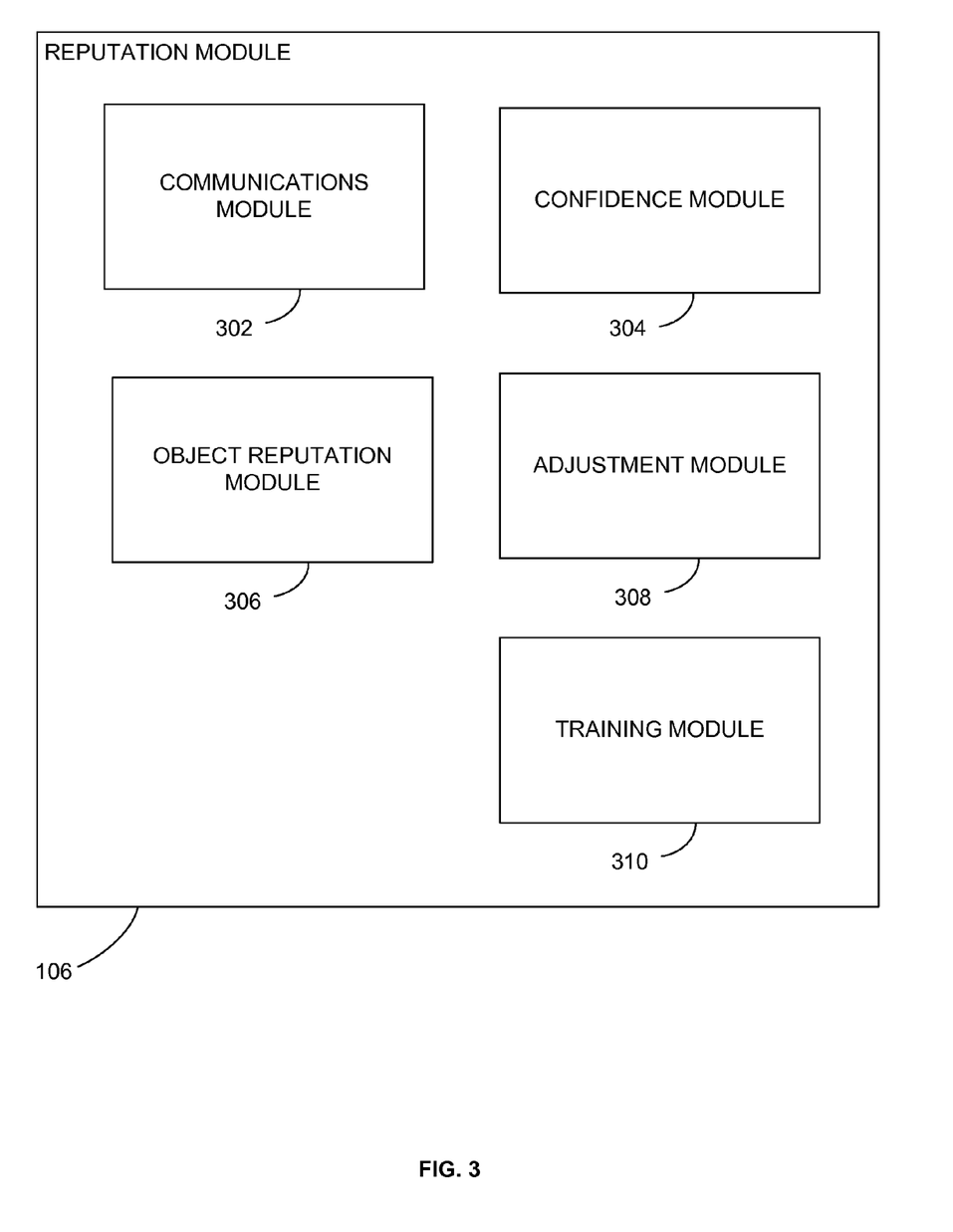
FIG. 3 is a high-level block diagram illustrating modules within the reputation module according to one embodiment.

FIG. 3 is a high-level block diagram illustrating a detailed view of the reputation module 106 according to one embodiment. In some embodiments, the reputation module 106 is incorporated into the security server 102 as a standalone application or as part of another product. As shown in FIG. 3, the reputation module 106 includes multiple modules. One of skill in the art will recognize that other embodiments of the reputation module 106 may have different and/or other modules than those described here, and that functionalities may be distributed among the modules in various ways.

A communications module 302 exchanges information with security modules 110 of clients 112 via the network 114. The communications module 302 receives information regarding objects, such as files, detected at the clients 112 by the security modules 110. For example, the communication module 302 can receive a report from a security module 110 containing an identifier of an object detected at a client 112, along with a request for the reputation score of the object. The identifier of the object can be, for example, a hash of the object. The communications module 302 interacts with the other modules of the reputation module 106 to determine the reputation score for the identified object and provides the score to the requesting security module 110.

In one embodiment, the reports also include information that the communications module 302 can use to identify the clients 112 that submit reports. In one embodiment, a report includes a unique identifier of the client 112. The unique identifier can be a cryptographic key or token that accompanies the report and/or is used to sign or authenticate the report. The communications module 302 can also detect other information that can be used to identify the clients 112, such as the IP addresses from which the reports are received. Depending upon the embodiment, the communications module 302 can access information in the data store 104 that correlates the unique identifier with additional information about the client 112, such as its geographic location, age in the system (e.g., time elapsed since the client's first report), other reports it submitted, etc.

A confidence module 304 determines confidence metrics for clients 112. As mentioned above, a confidence metric represents an amount of confidence in the veracity of the report received from a client 112. In one embodiment, the confidence metric is a continuous value from zero to one (inclusive) and is stored in data store 104. Depending upon the embodiment, the confidence metric can be associated with entities other than a client 112. For example, the confidence metric can be associated with a particular user of a client 112 or with a particular instance of a security module 110. For clarity, this description refers to confidence metrics as being associated with clients 112, but it will be understood that "clients" as used in this sense also refers to other entities with which confidence metrics can be associated.

The confidence module 304 uses information received from the clients 112 and/or information about the clients received from other sources to calculate the clients' confidence metrics. The confidence module 304 uses the clients' unique identifiers to associate and correlate information from the clients. Depending upon the embodiment, the confidence module 304 can use a variety of different factors to determine the confidence metric for a client.

An embodiment of the confidence module 304 uses the system age of a client as a factor in calculating the client's confidence metric. The system age of a client is the elapsed time that a client 112 has been active. For example, the system age for a client 112 can be the time elapsed from when the first report was received from the client, from when the security module 110 was installed on the client, or from when the security module was registered with the security server 102.

In general, a client 112 that is "older" receives a higher confidence metric. A client 112 that has only recently started submitting reports may be unreliable or otherwise untrustworthy. For example, a malicious entity may forge a large number of legitimate (and new) client identifiers and then submit, in high volume, reports attempting to boost the reputation scores of malware. The confidence module 304 can recognize these reports as coming from "young" clients 112 and use this factor to decrease the confidence metrics for these clients. The distinction between "young" and "old" clients can be established using predetermined value. For example, clients 112 having an age of less than six months can be considered "young" while other clients can be considered "old."

The confidence module 304 may also calculate a client's age based on characteristics other than elapsed time. In one embodiment, a client's age is measured based on how many reports of "prevalent" objects the client has submitted. Certain software applications, for example, are prevalent, or ubiquitous, among the clients 112. For example, a very large percentage of clients are likely to have at least one of a limited number of web browsing applications installed. The security modules 110 report such prevalent applications to the security server 102 along with other detected objects. The confidence module 304 can treat a client 112 that has submitted more reports of prevalent objects as "older" than clients that have submitted fewer reports of such objects. Such treatment will tend to decrease the confidence metrics of clients 112 that submit reports for only non-prevalent objects and therefore might be attempting to boost reputation scores of malware.

Similarly, the confidence module 304 can calculate a client's age based on a ratio of reports submitted for prevalent objects to reports submitted for "rare" objects, where "rare" objects are objects reported by very few clients. If a client 112 tends to submit more reports for rare objects than for prevalent objects, the client might be attempting to boost reputation scores of malware. Therefore, such clients 112 are treated as being "young" and will have decreased confidence metrics. Factoring a client's age on the system makes "gaming" the reputation system expensive because a client must be "old" to have a higher confidence metric.

An embodiment of the confidence module 304 uses the geographic location of a client 112 as a factor in calculating the client's confidence metric. Because most clients are not in multiple parts of the world at once, reports about the same object submitted by the same client from different geographic locations received close in time are indicative of suspicious behavior. Such reports might indicate, for example, that the client's identifier is being spoofed by multiple malicious actors. Therefore, the confidence module 304 may reduce the client's confidence metric based on receiving such reports. Additionally, different geographic locations may have varying confidence metrics. Thus, a client 112 submitting a report from a particularly suspicious geographic location may have a lower confidence metric than another client submitting an equivalent report from a less suspicious geographic location.

The confidence module 304 can also use the frequency of reports submitted by a client 112 as a factor in calculating the client's confidence metric. By tracking the patterns of report submissions of clients, the confidence module 304 may detect an abnormal amount of submissions by a particular client. The threshold of what constitutes an "abnormal" deviation from the expected submission pattern may vary from one client to another, based on the client's previous submission patterns. For example, a client 112 that has historically submitted only a few reports that suddenly submits a large volume of reports may be compromised. As a result, the confidence module 304 may decrease that client's confidence metric.

The confidence module 304 can also use the client identifiers to determine confidence metrics. The confidence module 304 can identify certain client identifiers as invalid, forged, hacked, or otherwise compromised. This identification can be performed, for example, by correlating the identifier in a received report with a list of identifiers maintained in the data store 104. The confidence module 304 may recognize compromised identifiers and utilize that information as a factor in calculating confidence metrics for the affected clients. Thus, a lower confidence metric may be given to a client with an invalid, or compromised, identifier.

Further, the confidence module 304 can use IP addresses of clients from which reports are received to influence the confidence metrics. Certain IP addresses can be identified as belonging to malicious entities or otherwise associated with low confidence. Therefore, the confidence module 304 can lower the confidence metrics of clients that send reports from certain IP addresses.

Other information received by the confidence module 304 can also influence the confidence metrics of clients. If a client submits malformed or bogus reports, the confidence module 304 has reason to suspect that the client has been compromised and can reduce the client's confidence metric. In embodiments where the client 112 is associated with a credit card account to which the confidence module 304 has access (such as when the user of the client has purchased the security module 110 from the security server 102 using a credit card), the confidence module 304 can use observed credit activity, such as a chargeback request, to influence the confidence metric. In other embodiments, aggregating reports based on one or more factors described above, such as geographic location, may also identify clients submitting suspicious reports based on irregular reporting patterns and influence the client's confidence metric.

Additional factors and heuristics received by the confidence module 304 may be used to influence the confidence metrics of clients. For example, receiving simultaneous submissions from more than one IP address by one client (the same client identifier) may indicate that the client has been compromised. Receiving an unusually high rate of submissions from a client, receiving repetitive reports about a few files from clients, and identifying clients that submit a disproportionately large or small number of files (or a disproportionate number of files of a given characteristic—e.g., the client seems to submit files that no one else ever submits) may further influence the confidence metrics of those clients. In addition, identifying clients known to send spam is another factor used by the confidence module 304 to influence the confidence metrics of clients, in one embodiment.

An embodiment of the confidence module 304 uses one or more of the factors described above to determine the confidence metric for a client 112. In embodiments where the confidence module 304 uses multiple factors, the confidence module can ascribe different weights to different factors. For example, the age of the client 112 can have a significant influence on the confidence metric, while the geographic location of the client can have only a minor influence. In addition, some embodiments use multiple confidence metrics, where each confidence metric corresponds to a single factor (e.g., age).

In one embodiment, the confidence module 304 uses the calculated confidence metrics to assign the clients to a whitelist or blacklist. Generally, the whitelist lists clients 112 that have high confidence metrics and are therefore presumed trustworthy. The blacklist, in contrast, lists clients 112 that have low confidence metrics and are therefore presumed untrustworthy. In some embodiments, the confidence module 304 uses thresholds to assign clients 112 to the lists. If a client's confidence metric falls below a certain threshold, that client is listed on the blacklist. Likewise, if a client's confidence metric is greater than a certain threshold, the client is listed on the whitelist. In some embodiments, the threshold is the same for both lists; in other embodiments, each list has a separate threshold.

Similarly, some embodiments of the confidence module 304 quantize the clients' confidence metrics to zero or one based on predetermined criteria. For example, a "young" client 112 having an age of less than six months, or a client that concurrently submits reports from two different geographic areas, can receive a confidence metric of zero irrespective of the other factors.

An object reputation module 306 calculates reputation scores for objects and stores the reputation scores in the data store 104. As mentioned above, a reputation score of an object represents an assessment of the trustworthiness of the object. In one embodiment, the reputation score is a number from zero to one (inclusive). A low reputation score indicates that the object is likely to be malware, while a high reputation score indicates that the object is likely to be legitimate.

In one embodiment, the object reputation module 306 calculates the reputation scores for objects based at least in part on the reported prevalence of the objects on the clients.

Objects that are widely distributed among clients, such as a popular word processing application, are more likely to be legitimate, while objects that are rarely encountered by the clients may be malware. Thus, an object having a high prevalence receives a higher reputation score in one embodiment.

In some embodiments, the reputation scores for objects are also be based on the hygiene scores of the clients 112 on which the objects are primarily found. A hygiene score represent an assessment of the trustworthiness of the client 112. "Trustworthiness" in the context of hygiene refers to the client's propensity for getting infected by malware, where a client 112 more frequently infected with malware is less trustworthy. For example, an object that is frequently found on clients 112 having high hygiene scores is likely to receive a high reputation score indicating a good reputation. In contrast, an object that is primarily found on clients 112 having low hygiene scores is likely to receive a low reputation score indicating a poor reputation. Reputation scores can also be based on other factors, such as reputation scores of websites on which objects are found, reputation scores of developers and/or distributors of the objects, and other characteristics such as whether the objects are digitally signed.

In addition, the object reputation module 306 influences the reputation scores for objects based on the confidence metrics of the clients that submitted reports associated with the object. In one embodiment, the object reputation module 306 excludes reports from clients 112 having confidence metrics below a threshold when calculating the reputation scores for objects. For example, reports from clients 112 on the blacklist described above can be excluded. Similarly, an embodiment of the object reputation module 306 uses reports from only clients having confidence metrics above a threshold when calculating the reputation scores for objects. For example, only reports from clients 112 on the whitelist described above can be used.

In another embodiment, the object reputation module 306 uses the ratios of low-and/or high-confidence metric clients to other clients reporting an object over a given time period to influence the reputation score for the object. In this embodiment, the object reputation module 306 acts according to the philosophy that an object primarily reported by clients 112 having low confidence metrics should probably have a low reputation score. At the same time, the object reputation module 306 remains flexible enough to enable real-time detection of reputation "gaming." For this embodiment, the object reputation module 306 in concert with the other modules of the reputation module 106 tracks the confidence metrics of the clients 112 on a per-object basis.

For a given object, the object reputation module 306 can determine the number of clients with low confidence metrics that have reported the object and the number of clients with high confidence metrics that have reported the object, where "high" and "low" confidence levels are determined using thresholds. If a sufficient ratio of high-confidence metric clients to other-confidence metric clients (i.e., non-high-confidence metric clients) have reported the object over a given time period, the object reputation module 306 increases the reputation score for the object. In contrast, if a sufficient ratio of low-confidence metric clients to other-confidence metric clients low-confidence metric clients have reported the object over the same time period, or a different time period, the object reputation module 306 decreases the reputation score for the object. Therefore, real-time detection of reputation "gaming" is enabled, and the object reputation module 306 may respond quickly to malware attacks of reputation "gaming" by malicious entities.

In one embodiment, the object reputation module 306 uses the confidence metrics to weight the reports. Thus, a report having a confidence level of 1.0 can be weighted twice as much as a report having a confidence level of 0.5 when calculating the reputation score for an object. Said another way, 200 reports from clients having confidence metrics of 0.50 can have the same influence on the reputation score as 100 reports from clients having confidence metrics of 1.0.

One embodiment of the object reputation module 306 uses machine learning to calculate the reputation scores for the objects. A statistical machine learning algorithm can use the confidence metrics, prevalence of reports, and other information about the clients 112 as features to build a classifier for determining the reputation scores. The classifier can be trained using features for a set of objects for which the actual dispositions are known (i.e., whether the objects are legitimate or malware is known).

An adjustment module 308 modifies the confidence metrics for clients 112 and reputation scores for objects as the values change over time. Confidence metrics can affect reputation scores, and, in some embodiments, reputation scores can affect confidence metrics. The adjustment module 308 modifies the confidence metrics and reputation scores as additional reports are received by the security server 102 over time. The adjustment module 308 can modify the metrics and scores continuously, on a periodic basis, and/or at other times depending upon the embodiment.

For example, in an embodiment where reports from young clients are disregarded (e.g., clients less than six months old receive confidence metrics of zero), an object that is primarily found on young clients may receive a low reputation score because it does not appear prevalent. Once the clients are no longer "young," the reports from the clients are no longer disregarded and the object now appears more prevalent. The adjustment module 308 consequently increases the reputation score for the object. Similarly, a client 112 with a high confidence metric may become compromised and submit numerous reports for objects that are subsequently found to be malware. In such a case, the adjustment module 308 can adjust the confidence metric for the client 112 downward.

A training module 310 can generate one or more reputation classifiers used to support machine-learning based calculation of reputation scores. In one embodiment, the training module generates a reputation classifier based on a dataset of features associated with the clients 112 and the objects. These features can include the confidence metrics for the clients 112, hygiene scores of the clients, reputations of objects, prevalence of objects, etc. The reputation classifier is a statistical model which specifies values such as weights or coefficients that are associated with the features used to determine the reputation scores. Suitable types of statistical models for use as the reputation classifier include but are not limited to: neural networks, Bayesian models, regression-based models and support vectors machines (SVMs). The reputation classifier can be trained by identifying objects for known cases of malware and legitimate software, and using historical client reports for those objects as ground truths. According to the embodiment, the training module 310 may generate the reputation classifier on a periodic basis or at other times. The training module 310 stores the generated reputation classifier for use by the object reputation module 306.

Figure 4:
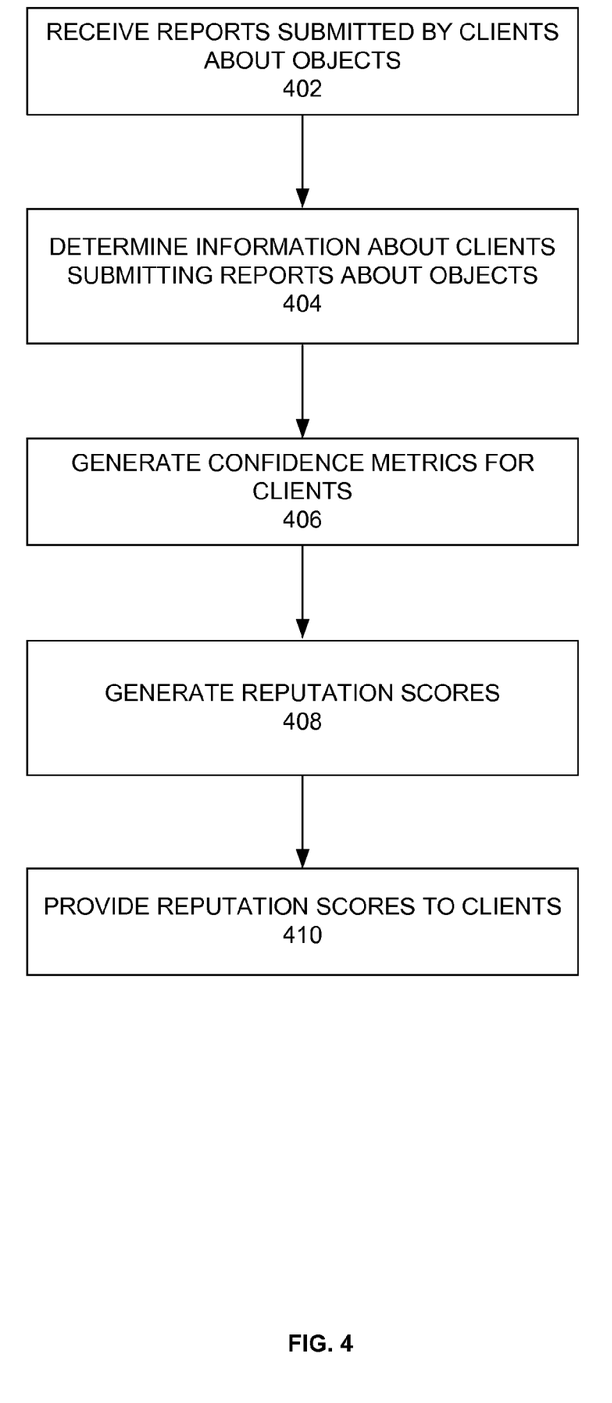
FIG. 4 is a flowchart illustrating the operation of the reputation module in determining reputation scores about objects using information from reports received from clients according to one embodiment.

FIG. 4 is a flowchart illustrating the operation of the reputation module 106 in determining reputation scores about objects using information from reports received from clients 112 according to one embodiment. It should be understood that these steps are illustrative only. Different embodiments of the reputation module 106 may perform the steps in different orders, omit certain steps, and/or perform additional steps not shown in FIG. 4.

As shown in FIG. 4, the reputation module 106 receives 402 reports submitted by clients 112 about objects. The reports identify objects detected at the client and can accompany requests for reputation scores for the objects. The reputation module 106 determines 404 information about the clients 112 that submit the reports. As explained above, the information can include an identifier of the client, a hash or other identifier of the object, and other information about the client. The reputation module 106 uses the information in the report to determine other information about the client, such as the client's age, geographic location, IP address, etc. The reputation module 106 uses the determined information to generate 406 confidence metrics for the clients 112. The reputation module 106 generates 408 reputation scores for the objects based, for example, on the prevalence of the objects at the clients. The generated reputation scores are influenced by the confidence metrics of the clients. The reputation module 106 provides 410 the object reputation scores to the clients 112. The clients 112 can use the reputation scores to detect malware at the clients.

The techniques described above may be applicable to various other types of detection systems, such as spam filters for messaging applications and other mechanisms designed to detect malware that utilize reputation scores of objects and confidence metrics of clients.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of using a computer to determine a reputation of an object in a reputation system, comprising:
   receiving reports from clients in the reputation system, the reports identifying an object detected at the clients;
   determining a prevalence of the object on the clients in the reputation system based on the reports received from the clients;
   determining information about the clients from the reports received from the clients, wherein the determined information about the clients includes an age of a client in the reputation system and the age of the client is determined responsive to an elapsed time that the client has been active in the reputation system;
   generating confidence metrics for the clients responsive to the determined information about the clients, the confidence metrics indicating amounts of confidence in the veracity of the reports received from the clients, wherein a confidence metric for the client is based at least in part on the age of the client, higher confidence metrics for the clients indicate that information in reports received from the clients is more likely to be true, and an older client receives a higher confidence metric;
   calculating a reputation score of the object responsive at least in part to the reports received from the clients, the prevalence of the object, and the confidence metrics for the clients, wherein a higher prevalence causes the object to receive a higher reputation score indicating that the object is unlikely to contain malicious software; and
   storing the reputation score of the object.

2. The method of claim 1, wherein a report from a client includes a request for the reputation score of the object, the method further comprising:
   providing the reputation score of the object to the client.

3. The method of claim 1, wherein the determined information about the clients includes an expected frequency submission pattern for reports submitted by a client, and wherein a confidence metric for the client is based at least in part on whether a frequency of reports submitted by the client deviates from the expected submission pattern.

4. The method of claim 1, wherein the age of the client is determined responsive to a determination of how many reports for objects with high prevalence the client has submitted and a client that has submitted more reports of objects with high prevalence is treated as older than clients that have submitted fewer reports of objects with high prevalence.

5. The method of claim 1, wherein calculating the reputation score of the object comprises:
   using a confidence metric threshold to identify clients having low confidence metrics;
   determining a ratio of clients having low confidence metrics that submitted reports identifying the object to all clients that submitted reports identifying the object; and
   calculating the reputation score of the object responsive at least in part to the determined ratio.

6. The method of claim 1, wherein calculating the reputation score of the object comprises:
   using a confidence metric threshold to identify clients having high confidence metrics;
   determining a ratio of clients having high confidence metrics that submitted reports identifying the object to all clients that submitted reports identifying the object; and
   calculating the reputation score of the object responsive at least in part to the determined ratio.

7. The method of claim 1, wherein generating confidence metrics for the clients comprises:
   determining a plurality of confidence factors for a client;
   associating different weights to different confidence factors; and
   generating a confidence metric for the client responsive to the weights associated with the confidence factors.

8. The method of claim 1, wherein generating confidence metrics for the clients comprises:
   determining whether a client submitted a malformed report; and
   reducing the client's confidence metric responsive to a determination that the client submitted the malformed report.

9. A non-transitory computer-readable storage medium storing executable computer program instructions for determining a reputation of an object in a reputation system, the computer program instructions comprising instructions for:
   receiving reports from clients in the reputation system, the reports identifying an object detected at the clients;
   determining a prevalence of the object on the clients in the reputation system based on the reports received from the clients;
   determining information about the clients from the reports received from the clients, wherein the determined information about the clients includes an age of a client in the reputation system and the age of the client is determined responsive to an elapsed time that the client has been active in the reputation system;

generating confidence metrics for the clients responsive to the determined information about the clients, the confidence metrics indicating amounts of confidence in the veracity of the reports received from the clients, wherein a confidence metric for the client is based at least in part on the age of the client, higher confidence metrics for the clients indicate that information in reports received from the clients is more likely to be true, and an older client receives a higher confidence metric;

calculating a reputation score of the object responsive at least in part to the reports received from the clients, the prevalence of the object, and the confidence metrics for the clients, wherein a higher prevalence causes the object to receive a higher reputation score indicating that the object is unlikely to contain malicious software; and storing the reputation score of the object.

10. The non-transitory computer-readable storage medium of claim 9, wherein a report from a client includes a request for the reputation score of the object and the computer program instructions further comprise:

providing the reputation score of the object to the client.

11. The non-transitory computer-readable storage medium of claim 9, wherein calculating the reputation score of the object comprises:

using a confidence metric threshold to identify clients having low confidence metrics;

determining a ratio of clients having low confidence metrics that submitted reports identifying the object to all clients that submitted reports identifying the object; and calculating the reputation score of the object responsive at least in part to the determined ratio.

12. The non-transitory computer-readable storage medium of claim 9, wherein calculating the reputation score of the object comprises:

using a confidence metric threshold to identify clients having high confidence metrics;

determining a ratio of clients having high confidence metrics that submitted reports identifying the object to all clients that submitted reports identifying the object; and calculating the reputation score of the object responsive at least in part to the determined ratio.

13. The non-transitory computer-readable storage medium of claim 9, wherein calculating the reputation score of the object comprises:

using a statistical machine learning algorithm to calculate the reputation score of the object.

14. A computer system for determining a reputation of an object in a reputation system, the computer system comprising:

a computer-readable storage medium storing executable computer program instructions, the computer program instructions comprising instructions for:

receiving reports from clients in the reputation system, the reports identifying an object detected at the clients;

determining a prevalence of the object on the clients in the reputation system based on the reports received from the clients;

determining information about the clients from the reports received from the clients, wherein the determined information about the clients includes an age of a client in the reputation system and the age of the client is determined responsive to an elapsed time that the client has been active in the reputation system;

generating confidence metrics for the clients responsive to the determined information about the clients, the confidence metrics indicating amounts of confidence in the veracity of the reports received from the clients, wherein a confidence metric for the client is based at least in part on the age of the client, higher confidence metrics for the clients indicate that information in reports received from the clients is more likely to be true, and an older client receives a higher confidence metric;

calculating a reputation score of the object responsive at least in part to the reports received from the clients, the prevalence of the object, and the confidence metrics for the clients, wherein a higher prevalence causes the object to receive a higher reputation score indicating that the object is unlikely to contain malicious software; and a processor for executing the computer program instructions.

15. The computer system of claim 14, wherein a report from a client includes a request for the reputation score of the object and the computer program instructions further comprise:

providing the reputation score of the object to the client.

16. The computer system of claim 14, wherein calculating the reputation score of the object comprises:

using a confidence metric threshold to identify clients having low confidence metrics;

determining a ratio of clients having low confidence metrics that submitted reports identifying the object to all clients that submitted reports identifying the object; and calculating the reputation score of the object responsive at least in part to the determined ratio.

17. The computer system of claim 14, wherein calculating the reputation score of the object comprises:

using a confidence metric threshold to identify clients having high confidence metrics;

determining a ratio of clients having high confidence metrics that submitted reports identifying the object to all clients that submitted reports identifying the object; and calculating the reputation score of the object responsive at least in part to the determined ratio.

* * * * *